(12) United States Patent
Redgrave

(10) Patent No.: US 7,306,293 B2
(45) Date of Patent: Dec. 11, 2007

(54) CORROSION-RESISTANT ABS TONE RING

(75) Inventor: Chris A. Redgrave, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 141 days.

(21) Appl. No.: 11/009,611

(22) Filed: Dec. 10, 2004

(65) Prior Publication Data

US 2006/0124411 A1    Jun. 15, 2006

(51) Int. Cl.
*B60T 13/00*    (2006.01)
(52) U.S. Cl. .......................................... 303/20; 324/173
(58) Field of Classification Search ................. 303/20, 303/167, 168, 199, 113.1; 188/1.11 E; 324/173, 324/174, 207.25, 207.21, 207.22
See application file for complete search history.

(56) References Cited

U.S. PATENT DOCUMENTS

| | | | | |
|---|---|---|---|---|
| 5,166,611 A * | 11/1992 | Kujawa et al. | ............. | 324/166 |
| 6,498,475 B2 * | 12/2002 | Foster et al. | ................ | 324/173 |
| 6,642,709 B2 * | 11/2003 | Heimann et al. | ........... | 324/173 |
| 2003/0052562 A1 | 3/2003 | Antony et al. | | |

FOREIGN PATENT DOCUMENTS

| | | |
|---|---|---|
| DE | 4445236 C1 | 3/1996 |
| EP | 1018381 A2 | 7/2000 |
| EP | 1088725 A1 | 4/2001 |
| GB | 2154614 A | 9/1985 |

OTHER PUBLICATIONS

Metal Coatings International, "Dacromet Coating", date unknown, pp. 1-7.*
Metal Coatings International, "Geomet Coating", date unknown, pp. 1-5.*

* cited by examiner

*Primary Examiner*—Pam Rodriguez
(74) *Attorney, Agent, or Firm*—Buckingham, Doolittle & Burroughs, LLP.; David P. Dureska; Brent L. Moore

(57) ABSTRACT

A tone ring of a vehicle anti-lock braking system of the type that is integrated into a disc brake rotor. The tone ring has a protective layer which enables it to withstand the combination of extreme heat and harsh environmental conditions to which it is exposed during operation of the vehicle. The protective layer is applied by thermally spraying a selected one of a plurality of materials, such as a nickel-based alloy, a high-chrome stainless steel, or non-ferrous materials such as an aluminum, copper-based alloys or a ceramic, on teeth of the tone ring, and without causing the protective layer to be deposited on the rotor braking surfaces. The protective layer generally prevents the formation of oxidation and corrosion byproduct layers on the teeth, to thereby maintain sensitivity for detection of teeth movement by the anti-lock braking system sensor during operation of the system.

7 Claims, 1 Drawing Sheet

CORROSION-RESISTANT ABS TONE RING

BACKGROUND OF THE INVENTION

1. Field of the Invention

The invention relates to anti-lock braking systems ("ABS") and, in particular, to the tone ring component of such systems. More particularly, the invention is directed to an ABS tone ring of the type integrated into a disc brake rotor, wherein a corrosion-resistant layer is applied to the tone ring by an economical and efficient process.

2. Background Art

In recent years, anti-lock braking systems, more commonly referred to as ABS, have become common safety equipment on virtually every type of vehicle ranging from cars to semi-trailers. In heavy-duty vehicles such as straight trucks and semi-trailers, U.S. government regulations require at least one axle of the tandem axles commonly found on such vehicles, to include an ABS sensor on each end of that axle. Some manufacturers of such heavy-duty vehicles go beyond government regulations and include the ABS sensors on every axle to improve ABS performance.

Each ABS sensor must be located adjacent to the inboard facing end of the wheel hub. The tone ring can be attached directly to the inboard end of the wheel hub, or alternatively, can be incorporated into the disc brake rotor, which in turn is attached to the inboard end of the wheel hub. More specifically, the tone ring is circular and is formed with notches, protrusions, teeth, or similar divisions, hereinafter generally referred to as teeth, and rotates with the wheel hub or disc brake rotor to which it is attached or into which it is integrated, respectively. As is well-known to those skilled in the art, the ABS sensors detect certain movements, such as distance, of the tone ring teeth, which in turn causes an electrical signal to be sent to the ABS electronic control unit enabling control of brake engagement. Thus, it is important that the ABS sensor be precisely positioned on the vehicle axle inboardly adjacent to and aligned with the tone ring teeth so that it can properly perform its sensing function.

In vehicles that utilize disc brakes, space is limited in the area of the axle ends where wheels and brakes are mounted. Such space constraints make integration of the ABS tone ring into the disc brake rotor desirable and in some cases necessary. A common method for integrating the tone ring into the rotor is to integrally cast or machine the features of the tone ring directly into the rotor structure.

However, one drawback of integrating the tone ring into the disc brake rotor is that the tone ring is subjected to significant thermal fluctuations due to the heat expelled from the rotor during normal braking operations. More specifically, a rotor integrated tone ring may be subjected to peak temperatures in excess of 1100 degrees Fahrenheit (°F.), and regularly is exposed to temperatures in the 300-500° F. range. In addition, all tone rings, whether integrated into a disc brake rotor or mounted directly on a wheel hub, are exposed to the environment beneath the vehicle. More specifically, the conditions beneath a vehicle during its operation can be very harsh, such that a tone ring is subjected to numerous corrosive and oxidizing substances including, for example, magnesium chloride, which is one compound used to melt ice on roads during winter months. The combination of thermal fluctuations and harsh environmental conditions has been known to cause formation of oxidation and corrosion byproduct layers on the teeth of integrally formed disc brake rotor tone rings. The accumulation of such undesirable materials on the tone ring teeth can lead to degradation and eventual loss of the signal being sensed by the ABS sensor. This loss of sensitivity can, in turn, lead to an ABS failure, which is an undesirable condition requiring the vehicle to be serviced.

Conventional means of protecting the integrally formed disc brake rotor tone ring, such as plating or painting, are not practical. More particularly, the extremely high operating temperature of a disc brake rotor would damage protective paints, organic-based corrosion coatings or regular platings. Plating, coating or painting the entire rotor with a special material capable of withstanding such extreme conditions would interfere with the performance characteristics of the brake, and selective plating, coating or painting of the tone ring portion of the rotor would require expensive and difficult masking of the rotor to prevent degradation of braking performance characteristics. Plating also can cause hydrogen embrittlement, which can in turn possibly cause catastrophic rotor failure.

The present invention corrosion-resistant ABS tone ring and method for applying the corrosion-resistant layer to the tone ring, is intended to economically and efficiently prevent the formation of oxidation and corrosion byproduct layers on the teeth of the integrally formed disc brake rotor tone ring. This result is accomplished through local application of a thermally-sprayed or flame-sprayed layer of corrosion-resistant material to the teeth of the integrally formed disc brake rotor tone ring. Such local application is possible because thermal spraying uses a hypersonic plasma stream that can be directed at close range with a nozzle that keeps the coating from affecting surrounding areas. Thermal spraying thus allows economical but efficient localized depositing of the corrosion-resistant material on the critical tone ring surfaces without affecting the performance characteristics of the brake rotor surfaces.

SUMMARY OF THE INVENTION

Objectives of the present invention include providing an integrally formed disc brake rotor tone ring that is corrosion-resistant.

Another objective of the present invention is to provide such a corrosion-resistant integrally formed disc brake rotor tone ring, in which the corrosion-resistant characteristic is achieved economically and efficiently.

These objectives and advantages are obtained by the corrosion-resistant ABS tone ring of the present invention, the general nature of which may be stated as including a tone ring of a vehicle anti-lock braking system, the tone ring being integrated into a disc brake rotor of the braking system, the disc brake rotor having braking surfaces, and the tone ring further being formed with divisions capable of being sensed by a sensor of the braking system, wherein the improvement comprises, a substantially corrosion-resistant layer disposed on the tone ring divisions, the rotor braking surfaces being free of the corrosion-resistant layer, whereby the sensitivity of the divisions is maintained for sensing by the sensor during operation of the braking system.

BRIEF DESCRIPTION OF THE SEVERAL VIEWS OF THE DRAWINGS

The preferred embodiment of the present invention, illustrative of the best mode in which applicant has contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
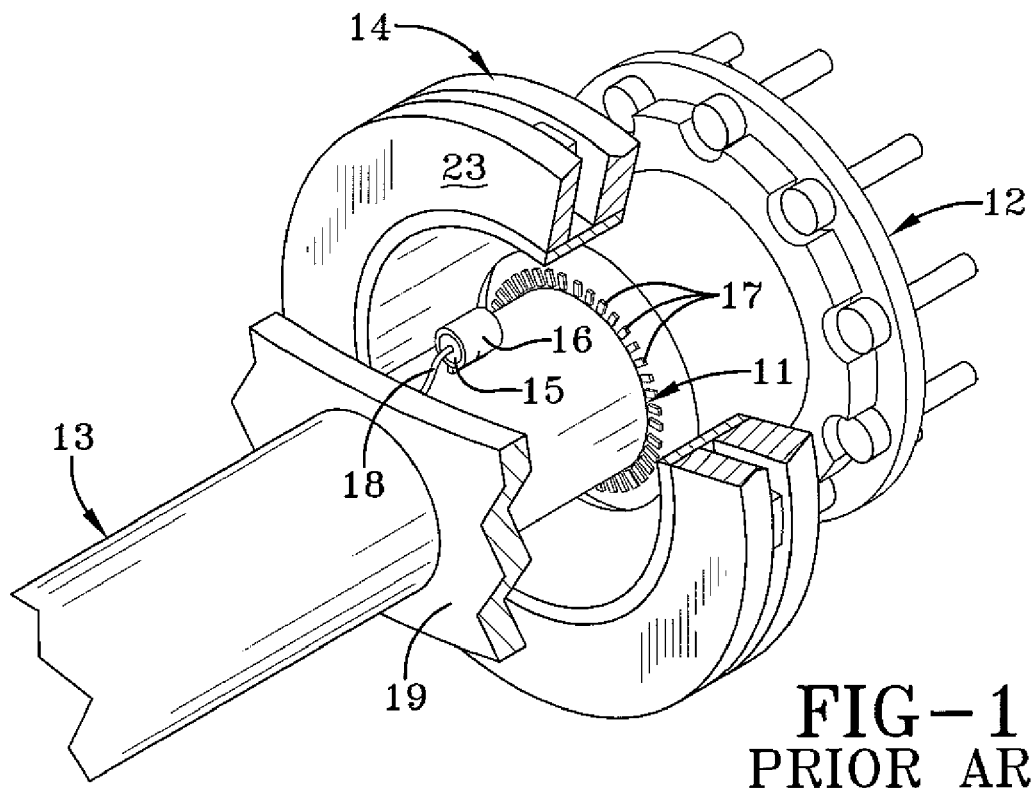
FIG. 1 is a fragmentary top perspective view, with portions broken away and looking in the outboard direction, of an axle end having certain discrete brake components, including a conventional/untreated tone ring and a disc brake rotor, each separately mounted on a wheel hub.

So that the environment in which the corrosion-resistant ABS tone ring of the present invention operates can be best understood, the two typical mounting locations for the tone ring on the end of an axle will be briefly described and shown in the drawings.

FIG. 1 shows a prior art ABS tone ring 11 mounted on the inboard end of a wheel hub 12. More specifically, wheel hub 12 is rotatably mounted on an outboard end of an axle 13. Tone ring 11 in turn typically is welded to the inboard end of wheel hub 12, adjacent to and outboard from a disc brake rotor 14. It can be seen that a sensor 15 of a type which is well-known in the ABS art, is mounted on a bracket 16. Bracket 16 in turn is mounted on axle 13 adjacent to and inboardly from tone ring 11.

Tone ring 11 conventionally is formed of a ferrous material such as cast iron or steel. Ferrous materials are preferred materials because they are magnetic and usually can be sensed most effectively by sensor 15. Tone ring 11 further is formed with divisions or teeth 17, which can be detected by sensor 15 and enable the sensor to send signals, such as distance information based on sensed movement of tone ring teeth 17, to the ABS electronic control unit (not shown) via an electrical cable 18. The electronic control unit then can control brake engagement under predefined circumstances as programmed into the unit. For the sake of relative completeness, a torque plate 19, which mounts other brake components such as disc brake calipers, is shown mounted on axle 13 inboard from rotor 14.

Figure 2:
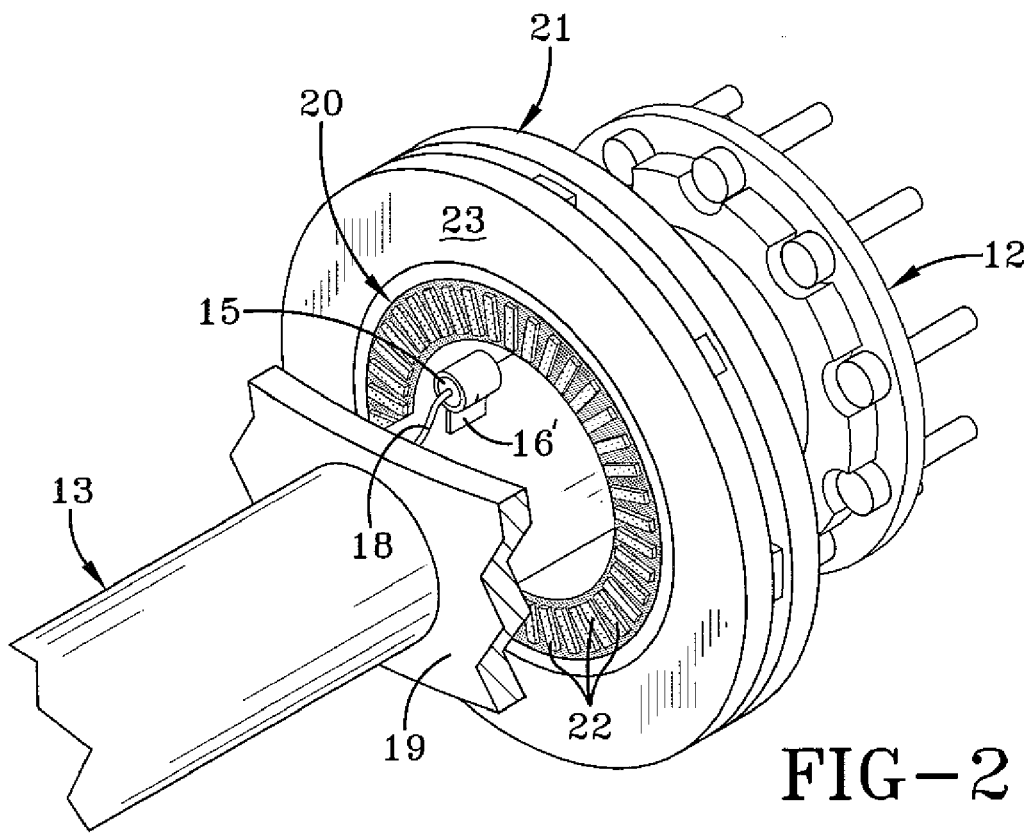
FIG. 2 is a view similar to FIG. 1, but showing the corrosion-resistant tone ring of the present invention integrated into the disc brake rotor.

FIG. 2 shows a second typical location for a tone ring, with corrosion-resistant tone ring 20 of the present invention having teeth 22 shown integrally formed with a disc brake rotor 21. More particularly, tone ring 20 is integrated into rotor 21 by integrally casting or machining teeth 22 of the tone ring into the rotor structure. Due to the larger diameter of tone ring 20 compared to tone ring 11, a different bracket 16', having more vertical height than bracket 16 shown in FIG. 1, must be used to align sensor 15 with tone ring teeth 22.

The method of the present invention, although it could be utilized if desired in connection with prior art tone ring 11 shown in FIG. 1, preferably is utilized in the structure shown in FIG. 2, that is, where tone ring 20 is incorporated into disc brake rotor 21. This is because although tone rings 11 and 20 both are subjected to a harsh environment beneath a vehicle in the form of contaminants such as road salt and the like, separate hub-mounted tone ring 11 stays at about the same temperature as wheel hub 12, which is relatively cool, and typically less than about 200° F. in a worst case scenario, but most often close to ambient temperature. In contrast, rotor-integrated tone ring 20 shown in FIG. 2 may be subjected to peak temperatures in excess of 1100° F. and regularly is subjected to temperatures in the 300-500° F. range. Thus, the combination of harsh environmental conditions and thermal fluctuations caused by such high temperatures can cause formation of oxidation and corrosion byproduct layers on teeth 22 of tone ring 20. The accumulation of such undesirable materials on tone ring teeth 22 leads to degradation and eventual loss of the ability of sensor 15 to sense movement of tone ring teeth 22, and thereby can interfere with the communication of a clear signal to the ABS electronic control unit. Such a condition can in turn lead to an ABS failure, which is an undesirable condition requiring the wheel to be serviced.

Conventional means of protecting the integrally formed disc brake rotor tone ring, such as plating or painting, are not practical. More particularly, the extremely high operating temperature of a disc brake rotor would damage protective paints, organic-based corrosion coatings or regular platings. Plating, coating or painting the entire rotor with a special material capable of withstanding such extreme conditions would interfere with the performance characteristics of the brake, and selective plating, coating or painting of the tone ring portion of the rotor would require expensive and difficult masking of the rotor to prevent degradation of braking performance characteristics. Plating also can cause hydrogen embrittlement, which can in turn possibly cause catastrophic rotor failure.

In accordance with an important feature of the present invention, a thermally-sprayed or flame-sprayed layer of corrosion-resistant material is locally applied to teeth 22, including the recessed areas of tone ring 20 between each tooth. Such thermal spraying allows economical but efficient localized depositing of the corrosion-resistant material on the critical surfaces of tone ring 20 without affecting the performance characteristics of brake rotor surface 23. This is possible because flame spraying uses a hypersonic plasma stream that can be directed at close range with a nozzle that keeps the coating from affecting surrounding areas.

Examples of corrosion-resistant materials that can be thermally sprayed on teeth 22 are a nickel-based steel alloy, or a high-chrome stainless steel. Alternatively, non-ferrous materials, such as aluminum, copper-based alloys or ceramics, also may be thermally sprayed on tone ring teeth 22 to provide protection from corrosion. Of course, other corrosion-resistant materials that can be thermally-sprayed also are contemplated by the present invention. Such thermal-spraying is effective in providing long-lasting corrosion-resistance, because the thermal-sprayed material is metallurgically bonded to teeth 22 at an atomic level. Thermal-spray processes and suitable alloying materials useful in the present invention are well-known to those skilled in the art.

Thus, the present invention effectively and economically solves the above-referenced corrosion problems caused by thermal fluctuations and harsh operating environments experienced by tone rings integrated into disc brake rotors without the prior art drawbacks found in prior art plating, painting or coating methods.

It is understood that the present invention corrosion-resistant ABS tone ring structure and method of manufacturing that structure can encompass tone rings having different types of divisions other than teeth, without affecting the overall concept of the present invention, and can be utilized in connection with virtually any type of axle, wheel hub, disc brake rotor, sensor, sensor bracket, or torque plate, other than those shown in the drawings. The present invention also can be utilized with virtually any type of vehicle that utilizes ABS, including passenger cars.

Accordingly, the improved corrosion-resistant ABS tone ring and method of manufacture of the present invention is simplified, provides an effective, safe, inexpensive and efficient structure and method which achieves all the enumerated objectives, provides for eliminating difficulties encountered with prior disc brake rotor integrated tone rings, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the corrosion-resistant ABS tone ring is used and installed, the characteristics of the construction, arrangement and method steps, and the advantageous, new and useful results obtained; the new and useful structures, devices, elements, arrangements, processes, parts and combinations are set forth in the appended claims.

What is claimed is:

1. A tone ring of a vehicle anti-lock braking system, said tone ring being integrated into a disc brake rotor of said braking system, said disc brake rotor having braking surfaces, and the tone ring further being formed with divisions capable of being sensed by a sensor of the braking system, wherein the improvement comprises:
   a) a substantially corrosion-resistant layer disposed on said tone ring divisions, said substantially corrosion-resistant layer being capable of withstanding temperatures in excess of at least about 790° F., said rotor braking surfaces being free of said corrosion-resistant layer, whereby the sensitivity of said divisions is maintained for sensing by said sensor during operation of said braking system.

2. The tone ring of claim 1, in which said substantially corrosion-resistant layer is formed of a material capable of being thermally-sprayed.

3. The tone ring of claim 1, in which said substantially corrosion-resistant layer is formed of a material selected from the group consisting of a nickel-based steel alloy, a high-chrome stainless steel, an aluminum, a copper-based alloy, and a ceramic.

4. The tone ring of claim 1, in which said tone ring is formed of a magnetic material; and in which said tone ring divisions are teeth.

5. A method of applying a substantially corrosion-resistant layer to a tone ring of a vehicle anti-lock braking system, said tone ring being integrated into a disc brake rotor of said braking system, said disc brake rotor having braking surfaces, and the tone ring further being formed with divisions capable of being sensed by a sensor of the braking system, said method steps including:
   a) thermally spraying said substantially corrosion-resistant layer on said tone ring divisions, said rotor braking surfaces being free of the corrosion-resistant layer, whereby said substantially corrosion-resistant layer is capable of withstanding temperatures in excess of at least about 790° F. and the sensitivity of said divisions is maintained for sensing by said sensor during operation of said braking system.

6. The method of claim 5, in which said corrosion-resistant layer is formed from a material selected from the group consisting of a nickel-based steel alloy, a high-chrome stainless steel, an aluminum, a copper-based alloy, and a ceramic.

7. The method of claim 5, in which said tone ring is formed of a magnetic material; and in which said tone ring divisions are teeth.

* * * * *